United States Patent Office 3,555,837
Patented Jan. 19, 1971

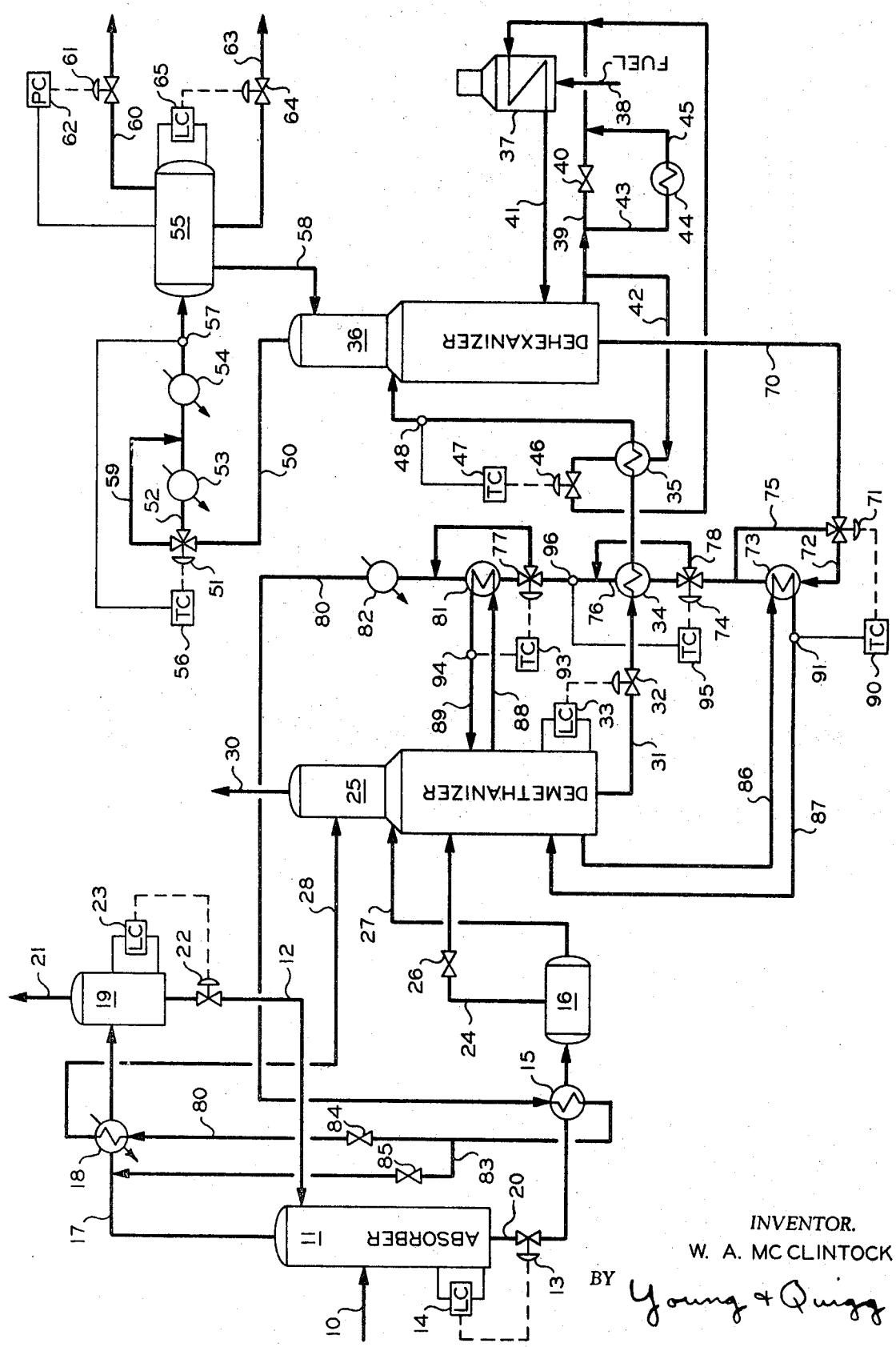

3,555,837
TEMPERATURE CONTROL OF FLUID SEPARATION SYSTEMS
William A. McClintock, Bartlesville, Okla., assignor to Phillips Petroleum Company, a corporation of Delaware
Filed Feb. 1, 1968, Ser. No. 702,379
Int. Cl. F25j 3/08
U.S. Cl. 62—17                                        6 Claims

ABSTRACT OF THE DISCLOSURE

Heavy constituents are removed from a gas stream by means of an absorber. The rich oil from the absorber is stripped in two distillation columns connected in series. The kettle product from the second column is passed in heat exchange relationship with fluid in the first column, the kettle product from the first column, and the rich oil from the absorber. Fluid from the lower region of the second column is passed in heat exchange relationship with the feed to the second column. Temperatures of several of the process streams are maintained constant by adjusting flows through the heat exchangers in response to temperature measurements.

---

It is common practice in the gas and petroleum industries to treat natural gas streams to remove substantial quantities of hydrocarbons heavier than methane. These heavier hydrocarbons are normally removed by contacting the natural gas stream with lean oil in an absorber. The rich oil removed from the absorber is then stripped of the absorbed hydrocarbons in one or more steps. For example, rich oil from the absorber can first be passed through a demethanizer, and the kettle product from the demethanizer can be passed to a dehexanizer. This lean oil recovered from the dehexanizer is recycled to the absorber and to the demethanizer. In operations of this type substantial volumes of natural gas are treated in order to obtain appreciable amounts of the heavier hydrocarbons. In addition, many gas treating plants are located in warm, arid regions, with the result that cooling water is difficult to obtain in adequate quantities. For these reasons, it is quite important to make efficient use of the heat contents of the various streams in order to minimize fuel requirements and reduce water requirements. It is also important to maintain accurate temperature control for efficient operation.

In accordance with the present invention, an improved temperature control system is provided for use in separation systems of the type described. In one specific embodiment of this invention, the kettle product stream from a dehexanizer is passed in heat exchange relationship with fluid taken from the kettle of a demethanizer, the kettle product stream from the demethanizer, and fluid in an intermediate region of the demethanizer. In addition, the same kettle stream from the dehexanizer can be passed in heat exchange relationship with the kettle product from the absorber and the overhead stream from the absorber before being returned to the demethanizer. Temperature control systems are provided to maintain the various streams at proper operating temperatures. In this manner, the overall efficiency of the separation process is substantially increased.

Accordingly, it is an object of this invention to provide an improved method of operating fluid separation systems.

A further object is to provide apparatus for use in removing hydrocarbons from natural gas streams.

A further object is to provide a temperature control system for use in a natural gasoline plant.

Other objects, advantages and features of the invention should become apparent from the following detailed description, which is taken in conjunction with the accompanying drawing which is a schematic representation of an embodiment of the separation system of this invention.

Referring now to the drawing in detail, a conduit 10 introduces a stream of natural gas into an absorber 11. A lean oil is introduced into the upper region of the absorber through a conduit 12. This oil descends through the absorber and removes substantial portions of the hydrocarbons heavier than methane from the natural gas. The resulting rich oil is removed through the bottom of absorber 11 through a conduit 20 which has a control valve 13 therein. Valve 13 is manipulated by a level controller 14 which sense the liquid level in absorber 11. Conduit 20 extends through a heat exchanger 15 to a flash tank 16. Overhead vapors are removed from the top of absorber 11 though a conduit 17 which extends through a cooler and heat exchanger 18 to a separator 19. Non-condensed gas, which comprises primarily methane, is removed from the top of the separator through a conduit 21. The condensate is returned to absorber 11 by conduit 12 which has a control valve 22 therein. Valve 22 is manipulated by level controller 23 which senses the liquid level in separator 19.

The rich oil from absorber 11 is partially vaporized in flash tank 16, and the resulting vapor is directed through a conduit 24 into a distillation column 25 which is operated as a demethanizer. A control valve 26 is disposed in conduit 24. The remainder of the rich oil is introduced into a higher region of demethanizer 25 by a conduit 27. A lean oil is introduced into the upper region of demethanizer 25 through a conduit 28. A residue gas stream is removed from the top of demethanizer 25 through a conduit 30, and a demethanized rich oil stream is removed from the bottom of demethanizer 25 through a conduit 31 which has a control valve 32 therein. Valve 32 is manipulated by a level controller 33 which senses the liquid level in demethanizer 25. Conduit 31 extends through heat exchangers 34 and 35 to a second distillation column 36 which is operated as a dehexanizer.

Heat is supplied to dehexanizer 36 by an external heater 37 which is supplied with fuel through a conduit 38. A conduit 39, which has a valve 40 therein, extends from the lower region of the dehexanizer to the inlet of heater 37. The resulting heated fluid is returned to the column through a conduit 41. A portion of the fluid withdrawn from dehexanizer 36 through conduit 39 is passed by a conduit 42 through heat exchanger 35 before entering heater 37. A third portion of the withdrawn fluid is directed by a conduit 43 to a heat exchanger 44 and is returned through a conduit 45. The flow through conduit 42 is regulated by a valve 46 which is adjusted by a temperature controller 47. The latter responds to the temperature sensed by a detecting element 48 which is disposed in conduit 31 adjacent the inlet to dehexanizer 36. The flow of dehexanizer kettle fluid through heat exchanger 35 is thus manipulated to maintain the temperature of the feed to the dehexanizer constant at a predetermined value. Heat exchanger 44 is employed to exchange heat between the liquid removed from the dehexanizer and process streams, not shown, in other portions of the plant. The relative flows of fluid directly to heater 37 and through heat exchanger 44 can be adjusted by the setting of valve 40.

Overhead vapors are removed from the top of dehexanizer 36 through a conduit 50 which communicates with a three-way valve 51. A conduit 52 extends from valve 51 through coolers 53 and 54 to an accumulator 55. A conduit 59 extends from valve 51 to the junction between accumulators 53 and 54 so as to bypass a portion of the vapors around cooler 53. The relative flows through conduits 52 and 59 are regulated by a temperature controller 56 which responds to a temperature sensing element 57 that is disposed in conduit 52 downstream from cooler 54. Valve 51 is thus manipulated to maintain the temperature at sensing element 57 constant at a predetermined value. A conduit 58 extends between accumulator 55 and the upper region of dehanizer 36 to return condensate to the column as reflux. A first overhead product stream is removed from the top of accumulator 55 through a conduit 60 which has a control valve 61 therein. Valve 61 is manipulated by a pressure controller 62 which is actuated by the pressure in accumulator 55. A second product stream is removed from accumulator 55 through a conduit 63 which has a control valve 64 therein. Valve 64 is manipulated by a level controller 65 which senses the liquid level in accumulator 55.

Lean oil is removed from the bottom of dehexanizer 36 through a conduit 70 which is connected to a three-way valve 7. A conduit 72 extends from valve 71 through a heat exchanger 73 to a three-way valve 74. A bypass conduit 75 extends from valve 71 to conduit 72 downstream from heat exchanger 73. A conduit 76 extends from valve 74 through heat exchanger 34 to a three-way valve 77. A bypass conduit 78 extends from valve 74 to conduit 76 downstream from heat exchanger 34. A conduit 80 extends from valve 77 through a heat exchanger 81, a cooler 82, heat exchanger 15 and cooler and heat exchanger 18 to join conduit 28. A conduit 83 extends from conduit 80 downstream from heat exchanger 15 to conduit 17 upstream from cooler and heat exchanger 18. Control valves 84 and 85 are positioned in respective conduits 80 and 83. Thus, a portion of the lean oil from dehexanizer 36 is introduced into demethanizer 25, and the remainder is introduced into absorber 11.

Fluid in the lower region of demethanizer 25 is passed through heat exchanger 73 by means of conduits 86 and 87. Fluid in an intermediate region of demethanizer 25 is passed through heat exchanger 81 by means of conduits 88 and 89. The temperature of fluid returned to demethanizer 25 through conduit 87 is maintained at a predetermined value by a temperature controller 90 which adjusts valve 71 to regulate the amount of lean oil which bypasses heat exchanger 73. Temperature controller 90 responds to a temperature sensing element 91 which is disposed in condut 87. The temperature of the fluid returned to the intermediate region of demethanizer 25 through conduit 89 is maintained constant by a temperature controller 93 which adjusts valve 77 in response to the temperature of fluid in conduit 89, the latter being measured by a temperature sensing element 94. The temperature of the lean oil in conduit 76 is maintained constant by a temperature controller 95 which manipulates valve 74 in response to the temperature of the lean oil in conduit 76, the latter being measured by a temperature sensing element 96.

The temperature control stream illustrated provides precise temperature control of the operation of columns 25 and 36. The hot lean oil removed from the dehexanizer provides the required heat to the demethanizer and the heat required to elevate the temperature of the incoming feed to the dehexanizers to a desired value. The lean oil from the dehexanizer is also employed in conjunction with cooler 82 to elevate the temperature of the feed to the demethanizer and to condense overhead vapors from the absorber.

As a specific example of the method of this invention, reference is made to the extraction of hydrocarbons heavier than methane from a stream of natural gas. The natural gas to be treated is introduced through conduit 10 at a rate of 60,000,000 standard cubic feet per day, at a pressure of 550 p.s.i.g., and at a temperature of 0° F. The system is operated to remove approximately 25% of the ethane, 75% of the propane, over 98% of the butanes and essentially all of the pentane and heavier present in the natural gas. Lean oil is introduced into absorber 11 at a rate of 150,000 gallons per day and at a temperature of 0° F. The fluid flowing through conduit 20 is at a temperature of 6° F. upstream of heat exchanger 15 and 35° F. downstream of the heat exchanger. The kettle product from column 25 is at a temperature of 190° F. upstream of heat exchanger 34, 220° F. between heat exchangers 34 and 35, and 240° F. down stream of heat exchanger 35. The kettle product from column 36 is at a temperature of 494° F. The temperature of this kettle product at the inlet of heat exchanger 34 is 355° F., and is reduced to 130° F. at the inlet of cooler 82. Cooler 82 reduces the temperature to 90° F., and a further reduction to 15° F. takes place through heat exchanger 15. Cooler and heat exchanger 18 cools the two streams flowing therethrough to 0° F. The temperatures of fluids in conduits 86 and 87 are 130° F. and 190° F., respectively. The temperatures of fluids in conduits 88, 89 are 63° F. and 110° F., respectively. The fluid in conduit 42 is at a temperature of 485° F. upstream of heat exchanger 35 and at a temperature of 400° F. downstream of the heat exchanger. Heater 37 elevates the temperature of the oil to 494° F.

It should be evident that the foregoing specific temperatures are merely illustrative of the operation of this invention, and that the invention is not limited thereto. In order to simplify the drawing and description, various pumps and valves which normally are employed have been omitted.

While the invention has been described in conjunction with a presently preferred embodiment, it obviously is not limited thereto.

What is claimed is:

1. In a fluid separating system which includes first and second distillation columns, first conduit means commucating with said first column to introduce a fluid mixture, second conduit means extending from the bottom of said first column to said second column to pass kettle produced from said first column to said second column, and third conduit means communicating with the bottom of said second column to remove kettle product; the improvement comprising:

first and second heat exchangers connected to said third conduit means;

means to pass fluid in the kettle of said first column through said first heat exchanger in heat exchange relationship with the kettle product conveyed by said third conduit means and to return such fluid to the kettle of said first column;

means connecting said second conduit means to said second heat exchanger so that fluids conveyed through said second and third conduit means are heat exchanged with one another;

fourth conduit means connected to said third conduit means to bypass said first heat exchanger, first valve means to control the amount of fluid flowing through said fourth conduit means, and means to control said first valve means in response to the temperature of the kettle fluid from said first column after passage through said first heat exchanger; and fifth conduit means connected to said third conduit means to bypass said second heat exchanger, second valve means to control the amount of fluid flowing through said fifth conduit means, and means to control said second valve means in response to the temperature of fluid in said third conduit means downstream of said second heat exchanger.

2. The apparatus of claim 1, further comprising:

a third heat exchanger connected to said third conduit means, and means to pass fluid from an intermediate region of said first column through said third heat exchanger and to return same to said first column; and a fourth heat exchanger connected to said second conduit means, and means to pass fluid from the lower region of said second column through said fourth heat exchanger and to return same to said second column.

3. The apparatus of claim 2, further comprising:
an absorber;
means to introduce a gaseous stream into said absorber, said first conduit means being connected to the bottom of said absorber to pass fluid from said absorber to said first column;
a fifth heat exchanger in said third conduit means, said fifth heat exchanger also being connected to said first conduit means so that fluids passing through said first and third conduit means are heat exchanged with one another, the outlet end of said third conduit means being connected to an upper region of said first column; and
means connected between said third conduit means downstream of said fifth heat exchanger and said absorber to introduce a portion of the kettle product from said third column into said absorber.

4. The apparatus of claim 3, further comprising:
sixth conduit means connected to said third conduit means to bypass said third heat exchanger, third valve means to control the flow of fluid through said sixth conduit means, and means to regulate said third valve means in response to temperature of the fluid from said intermediate region of said first column after passage through said third heat exchanger; and
means to control the flow of fluid from the lower region of said second column through said fourth heat exchanger in response to the temperature of the fluid in said second conduit means downstream of said fourth heat exchanger.

5. In a process wherein a stream of a fluid mixture is contacted with a lean oil stream in a first distillation zone, a first kettle product stream is removed from said first distillation zone and passed to a second distillation zone, and a second kettle product stream is removed from the second distillation zone, the improvement comprising:
passing said second kettle product stream in heat exchange relationship with fluid in the lower region of said first distillation zone;
passing said second kettle product stream in heat exchange relationship with said first kettle product stream before said first kettel product stream is introduced into said second distillation zone;
passing said second kettle product stream in heat exchange relationship with fluid in an intermediate region of said first distillation zone, and passing said first kettle product stream in heat exchange relationship with fluid in the lower region of said second distillation zone;
measuring the temperature of fluid in the lower region of said first distillation zone after being heat exchanged with said second kettle product, and controlling the amount of said second kettle product passed in heat exchange therewith in response to such measured temperature; and
measuring the temperature of said second kettle product after passage in heat exchange relationship with said first kettle product, and controlling the amount of said second kettle product passed in heat exchange relationship with said first kettle product in response to such measured temperature;
measuring the temperature of fluid in said intermediate region of said first zone after passage in heat exchange relationship with said second kettle product and controlling the amount of said second kettle product passed in heat exchange relationship therewith in response to such measured temperature; and
measuring the temperature of the first kettle product prior to introduction into said second distillation zone and controlling the amount of fluid in the lower region of said second distillation zone which is passed in heat exchange relationship with said first kettle product in response to such measured temperature.

6. The method of claim 5, further comprising:
passing a fluid mixture into an absorption zone;
introducing a portion of the kettle product from said second distillation zone into the upper region of said absorption zone after said second kettle product is passed through the heat exchange steps of claim 5;
passing the remainder of said second kettle product into the upper region of said first distillation zone after the heat exchange steps of claim 5;
passing fluid removed from the lower region of said absorption zone in heat exchange relationship with said second kettle product after the heat exchange steps of claim 5 and prior to the introduction of such kettle product into said absorption zone and said first distillation zone; and
thereafter introducing said fluid removed from the lower region of said absorption zone into said first distillation zone as said stream of fluid mixture.

References Cited

UNITED STATES PATENTS

| | | | |
|---|---|---|---|
| 2,596,785 | 5/1952 | Nelly | 208—341 |
| 2,614,658 | 10/1952 | Maher | 208—341 |

OTHER REFERENCES

Middlebrook, V. E.: Natural Gas Processing; Oil and Gas Journal, Dec. 7, 1950, pp. 85–87, 107–108, vol. 49, No. 31.

NORMAN YUDKOFF, Primary Examiner

A. F. PURCELL, Assistant Examiner

U.S. Cl. X.R.

196—132; 203—25; 208—341